US009252924B2

(12) United States Patent
Matsuo et al.

(10) Patent No.: US 9,252,924 B2
(45) Date of Patent: Feb. 2, 2016

(54) WIRELESS APPARATUS AND WIRELESS SYSTEM

(75) Inventors: Ryoko Matsuo, Tokyo (JP); Tomoya Tandai, Kawasaki (JP); Takeshi Tomizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 13/562,858

(22) Filed: Jul. 31, 2012

(65) Prior Publication Data

US 2013/0028154 A1 Jan. 31, 2013

Related U.S. Application Data

(63) Continuation of application No. PCT/JP2010/000596, filed on Feb. 2, 2010.

(51) Int. Cl.
*H04L 1/16* (2006.01)

(52) U.S. Cl.
CPC ............ *H04L 1/1685* (2013.01); *H04L 1/1671* (2013.01)

(58) Field of Classification Search
CPC ..... H04W 84/18; H04W 76/02; H04W 28/04; H04W 24/00; H04L 29/06
See application file for complete search history.

(56) References Cited

U.S. PATENT DOCUMENTS 8,650,448 B2 * 2/2014 Li .......................... H04L 1/0015 370/329
2001/0043615 A1 * 11/2001 Park .................... H04N 7/17318 370/474
2008/0056303 A1 * 3/2008 Sebire ................... H04L 1/1664 370/474
2008/0175247 A1 * 7/2008 Agarwal ............... H04L 1/1841 370/392
2008/0310338 A1 * 12/2008 Charpenter et al. .......... 370/315
2009/0052563 A1 * 2/2009 Kim ...................... H04L 1/0045 375/260

(Continued)

FOREIGN PATENT DOCUMENTS

JP 2000-32007 1/2000
JP 2002-135362 5/2002

(Continued)

OTHER PUBLICATIONS

Chieh-Yih Wan et al., titled "PSFQ: a reliable transport protocol for wireless sensor networks," (Wan hereinafter) was published in Proceeding WSNA '02 Proceedings of the 1st ACM international workshop on Wireless sensor networks and applications, pp. 1-11; ACM New York, NY, table of contents ISBN:1-58113-589-0; doi>10.1145/570738.570740.*

(Continued)

*Primary Examiner* — Andrew Lai
*Assistant Examiner* — Hoyet H Andrews, III
(74) *Attorney, Agent, or Firm* — Finnegan, Henderson, Farabow, Garrett & Dunner, L.L.P.

(57) ABSTRACT

One embodiment provides a wireless apparatus including: a reception unit which receives a data signal having a header field and a data field, the header field including a reply request which specifies either an acknowledgement or a negative acknowledgement; a decision unit which decides a reception result indicating whether the header field and the data field have been received successfully or unsuccessfully; and a transmission unit which transmits the acknowledgement or the negative acknowledgement in accordance with the reply request and the reception result of the data field when the header field has been received successfully, and transmits the negative acknowledgement when the header field has been received unsuccessfully.

7 Claims, 13 Drawing Sheets

(56) References Cited

U.S. PATENT DOCUMENTS

| | | | | |
|---|---|---|---|---|
| 2010/0110984 | A1* | 5/2010 | Umesh .................. | H04L 1/1621 370/328 |
| 2010/0128663 | A1* | 5/2010 | Kuroda ................. | H04L 1/0007 370/328 |
| 2010/0226349 | A1 | 9/2010 | Matsuo et al. | |
| 2010/0309869 | A1* | 12/2010 | Kim ...................... | H04W 72/04 370/329 |

FOREIGN PATENT DOCUMENTS

| | | |
|---|---|---|
| JP | 2002-232512 | 8/2002 |
| JP | 2003-524996 | 8/2003 |
| JP | 2006-246027 | 9/2006 |
| JP | 2008-503157 | 1/2008 |
| JP | 4110522 | 4/2008 |
| JP | 2009-517935 | 4/2009 |
| JP | 2010-206469 | 9/2010 |
| WO | WO 03/032566 A1 | 4/2003 |

OTHER PUBLICATIONS

Notification of Reasons for Refusal issued by the Japanese Patent Office on Sep. 13, 2013, for Japanese Patent Application No. 2011-552575, and English-language translation.

International Search Report from Japanese Patent Office for International Application No. PCT/JP2010/000596, Mailed May 18, 2010.

* cited by examiner

WIRELESS APPARATUS AND WIRELESS SYSTEM

CROSS-REFERENCE TO RELATED APPLICATION(S)

This is a Continuation Application of PCT Application No. PCT/JP10/000596, filed on Feb. 2, 2010, which was published under PCT Article 21 (2) in Japanese, the entire contents of which are incorporated herein by reference.

FIELD

Embodiments described herein relate generally to a wireless apparatus and a wireless system.

BACKGROUND

Methods using an acknowledgement and methods using a negative acknowledgement have been known as methods for determining whether a receiver has correctly received a signal transmitted by a transmitter or not.

For example, a wireless LAN system uses an acknowledgement (ACK). A receiver in the wireless LAN system transmits an ACK signal only when the receiver has correctly received a signal transmitted by a transmitter.

On the other hand, JP-4110522-B discloses a one-to-one communication system using a negative ACK (NACK). Only one transmitter and only one receiver belong to the one-to-one communication system. Therefore, the transmitter and the receiver in the one-to-one communication system hardly suffer interference from any other wireless apparatus. Accordingly, probability of success in receiving a signal is higher than probability of failure in receiving a signal. The receiver in JP-4110522-B transmits a NACK signal only when the receiver has failed in receiving a signal.

Any reply signal (ACK signal or NACK signal) is a control signal which includes no data. Thus, the throughput of the system deteriorates when the number of times of transmitting the reply signal increases. The throughput of the system can be improved if either an ACK or a NACK is used in accordance with a propagation environment as in the wireless LAN system or the system in JP-4110522-B.

There are plural kinds of reply signals, such as an ACK signal, a NACK signal, a BA (Block ACK) signal, etc. Therefore, the transmitter transmits a signal having a header portion to which information (reply signal type, ReqACKType) indicating that which reply signal should be used is added. The receiver demodulates the header portion of the signal and sends back a reception result using the reply signal specified in the header portion.

When the receiver fails in receiving a header portion of a signal due to deterioration of the propagation environment, the receiver cannot demodulate the reply signal type and cannot send back a reply signal.

When there is no reply from the receiver in the case where the transmitter requests a NACK signal, the transmitter cannot determine whether there is no reply because the receiver has succeeded in receiving a signal, or a reply cannot be sent back because the propagation environment deteriorates.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

In general, one embodiment provides a wireless apparatus including: a reception unit which receives a data signal having a header field and a data field, the header field including a reply request which specifies either an acknowledgement or a negative acknowledgement; a decision unit which decides a reception result indicating whether the header field and the data field have been received successfully or unsuccessfully; and a transmission unit which transmits the acknowledgement or the negative acknowledgement in accordance with the reply request and the reception result of the data field when the header field has been received successfully, and transmits the negative acknowledgement when the header field has been received unsuccessfully.

Embodiments will be described below with reference to the drawings. Parts referred to by the same numerals are assumed to perform similar operations in the following examples, so that redundant description thereof will be omitted.

Figure 1:
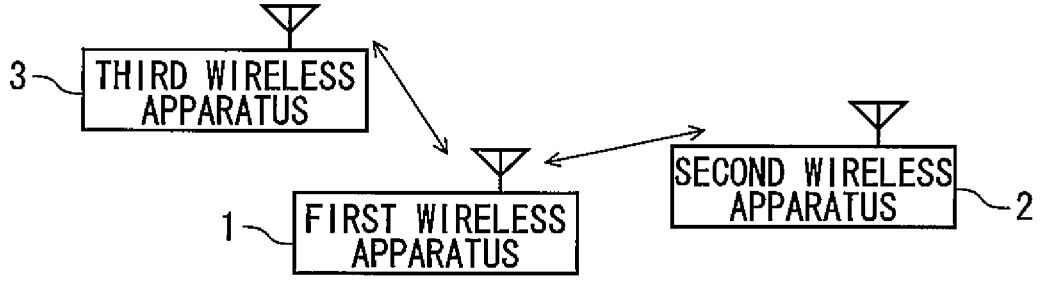
FIG. 1 illustrates a wireless system.

First, the outline of a wireless system according to the embodiment will be described with reference to FIG. 1. The wireless system in FIG. 1 has first to third wireless apparatuses 1 to 3. In the wireless system, the communication range of each wireless apparatus is no wider than about several tens of centimeters. Thus, in the case of short-range communication in which the communication range of each wireless apparatus is about several tens of centimeters, several wireless apparatuses at the most are connected to one wireless apparatus. Although three wireless apparatuses are illustrated in FIG. 1, the number of wireless apparatuses is not limited thereto but may be about two to five. In the example of FIG. 1, a first wireless apparatus 1 and a second wireless apparatus 2 are making wireless communication with each other. In addition, the first wireless apparatus 1 and a third wireless apparatus 3 are making wireless communication with each other. Although the following description will be made on wireless communication between the first wireless apparatus 1 and the second wireless apparatus 2, it is a matter of course that description may be made on wireless communication between the first and third wireless apparatuses 1 and 3 or wireless communication between the second and third wireless apparatuses 2 and 3.

In order to make connections easier and more efficient than in a method in which one wireless apparatus serves as an access point to transmit a broadcast signal (e.g. a Beacon signal) and each wireless apparatus makes random backoff control whenever the wireless apparatus makes transmission, the wireless system makes communication as follows.

First, when there occurs data to be transmitted to the second wireless apparatus 2, the first wireless apparatus 1 transmits a connection request signal to the second wireless apparatus, for example, by use of random backoff control. The second wireless apparatus 2 receives the connection request signal and transmits a connection permission signal to the first wireless apparatus 1. Thus, the first and second wireless apparatuses 1 and 2 establish connection.

After establishing the connection, the first wireless apparatus 1 divides the data to be transmitted, into plural pieces, to thereby generate plural split data. The first wireless apparatus 1 generates data signals from the split data and transmits the data signals to the second wireless apparatus 2. Each of the data signals includes a reply request (reply signal type) indicating the kind of reply signal. On receiving the data signal, the second wireless apparatus 2 transmits a reply signal in accordance with the reply request and a reception result of the data signal.

COMMUNICATION EXAMPLE 1

Figure 2:
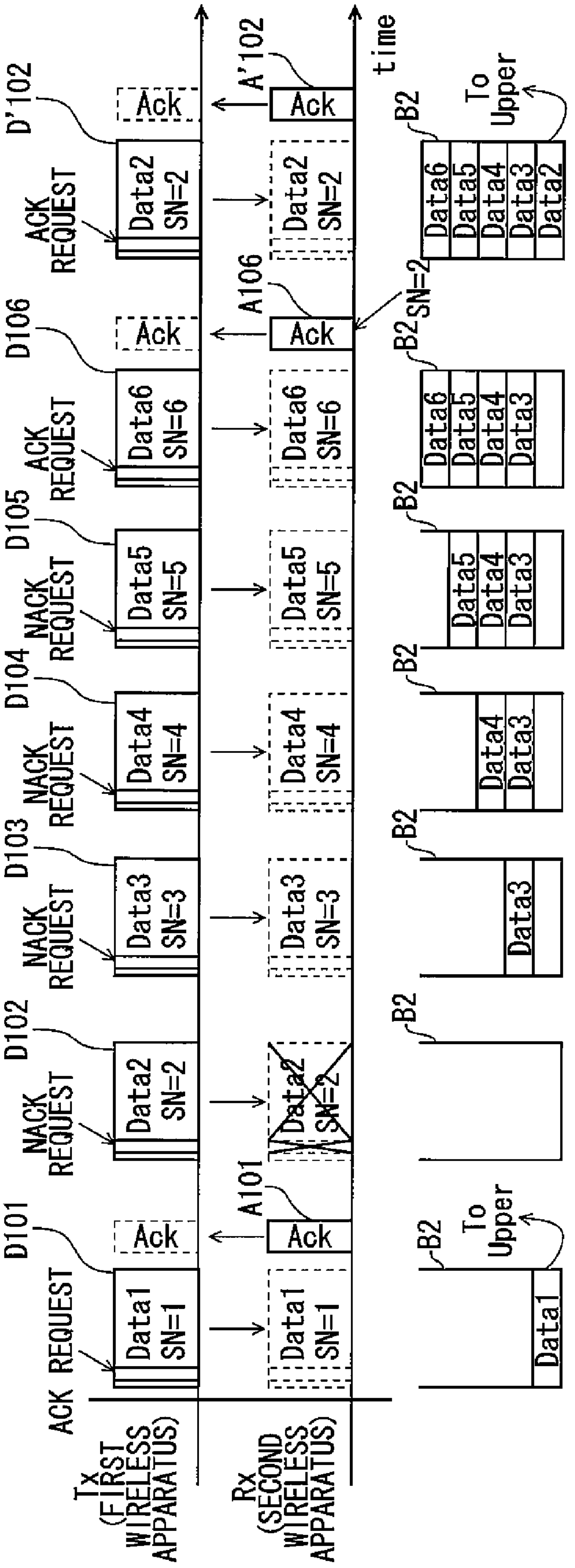
FIG. 2 illustrates packet exchange between a first wireless apparatus and a second wireless apparatus.

Communication between the first and second wireless apparatuses 1 and 2 after connection between the first wireless apparatus 1 as a transmitter and the second wireless apparatus 2 as a receiver is established will be described with reference to FIG. 2. Assume that the first and second wireless apparatuses 1 and 2 have reception buffers with sufficient sizes respectively. In addition, assume that the first wireless apparatus 1 grasps the size of the reception buffer possessed by the second wireless apparatus 2. Hereinafter, signals framed by solid lines in the drawings designate transmission signals, and signals framed by broken lines designate reception signals.

After establishing the connection, the first wireless apparatus 1 transmits a data signal D101. Though not shown, the data signal D101 has a header field and a data field. The header field includes information (reply request) indicating that which type of reply signal should be used and information (SN: Sequence Number) indicating the number of the transmitted data signal in the transmission sequence of data signals. The data field includes split data obtained as a split part of the data to be transmitted. When transmitting the data signal D101, the first wireless apparatus 1 also requests an ACK signal as a reply. Accordingly, information (ACK request) to request an ACK signal and information indicating SN=1 are written in the header field of the data signal D101.

On receiving the data signal D101, the second wireless apparatus 2 determines whether the header field and the data field have been demodulated correctly or not. When the second wireless apparatus 2 has received the data signal D101 and has demodulated the header field/data field correctly, the second wireless apparatus 2 is regarded as having succeeded in receiving the header field/data field. When the second wireless apparatus 2 has received the data signal D101 but has failed in demodulating the header field/data field correctly, the second wireless apparatus 2 is regarded as having failed in receiving the header field/data field.

When the header field and the data field have been received correctly, the second wireless apparatus 2 stores split data Data1 included in the data field, into a reception buffer B2. The second wireless apparatus 2 sends the split data Data1 to an upper layer (Upper) from the reception buffer B2. In addition, the second wireless apparatus 2 demodulates the header field to conclude that the first wireless apparatus 1 requests an ACK signal. Thus, the second wireless apparatus 2 sends an ACK signal A101 back to the first wireless apparatus 1. In addition, the second wireless apparatus 2 stores the SN(=1) of the data signal D101.

On receiving the ACK signal A101, the first wireless apparatus 1 transmits a data signal D102 with SN=2. Assume that the first wireless apparatus 1 sets a negative acknowledgement (NACK request) as a reply request of the data signal D102. For example, the first wireless apparatus 1 regards the propagation environment as good because the data signal D101 has been transmitted to the second wireless apparatus 2 correctly. Thus, the first wireless apparatus 1 changes the request from the ACK request to the NACK request. Alternatively, the first wireless apparatus 1 may determine whether the propagation environment is good or bad from the reception result of the ACK signal 101, and then determine whether to change the request from the ACK request to the NACK request.

Assume that the second wireless apparatus 2 receives the data signal D102 but fails in receiving the header field and the data field due to deterioration of the propagation environment. Due to the failure in receiving the data field, the second wireless apparatus 2 stores nothing into the reception buffer B2. Due to the failure in receiving the header field, the second wireless apparatus 2 cannot determine the reply request. Accordingly, the second wireless apparatus 2 sends neither an ACK signal nor a NACK signal.

Since a NACK signal has not been sent back for a predetermined period since the transmission of the data signal D102, the first wireless apparatus 1 regards the transmission of the data signal D102 as successful. The first wireless apparatus 1 transmits the next data signal D103. A negative acknowledgement is set as a reply signal type in the data signal D103.

The second wireless apparatus 2 receives the data signal D103. The second wireless apparatus 2 determines whether the second wireless apparatus 2 itself has succeeded or failed in receiving the header field and the data field. The second wireless apparatus 2 determines whether to transmit a reply signal or not based on the reply request included in the header field. In this case, the reply signal type is a NACK signal and the data signal D103 has been received successfully. Thus, the second wireless apparatus 2 sends no reply signal.

The second wireless apparatus 2 stores split data DATA3 included in the data field, into the reception buffer B2. On this occasion, from the reception result of the header field, the second wireless apparatus 2 concludes that the SN of the data signal D103 is 3, which is not consecutive to the SN(=1) of the data signal D101 received the last time. That is, the second wireless apparatus 2 concludes that the data signal D102 which has not been received exists between the data signal D101 received the last time and the data signal D103 received this time. Thus, the second wireless apparatus 2 stores the split data DATA3 into the reception buffer B2 while leaving a region where split data included in the data signal D102 can be stored. In addition, the second wireless apparatus 2 stores the SN(=3) of the data D103 which has been received this time and the SN(=2) of the data signal D102 which has not been received yet.

Since a NACK signal has not been sent back for a predetermined period since the transmission of the data signal D103, the first wireless apparatus 1 regards the transmission of the data signal D103 as successful. The first and second wireless apparatuses 1 and 2 transmit and receive data signals D104 and D105 in the same manner.

The total sum of the split data DATA2, DATA3, DATA4 and DATA5 which have been transmitted with the NACK request set as the reply signal type, split data DATA6 which is scheduled to be transmitted this time, and split data DATA7 which is scheduled to be transmitted next time, exceeds the size of the reception buffer B2 possessed by the second wireless apparatus 2. That is, when the split data DATA6 is stored in the reception buffer B2 as shown in FIG. 2, no other data except the split data DATA2 can be stored. In this case, the first wireless apparatus 1 transmits the data signal D106 including the split data DATA6, with the ACK request set as the reply request.

On receiving the data signal D106, the second wireless apparatus 2 determines whether the second wireless apparatus 2 itself has succeeded in receiving the header field and the data field or not. When the header field and the data field have been received correctly, the second wireless apparatus 2 stores the split data Data6 included in the data field, into the reception buffer B2. In addition, the second wireless apparatus 2 demodulates the header field to conclude that the first wireless apparatus 1 requests an ACK signal. Thus, the second wireless apparatus 2 sends an ACK signal A106 back to the first wireless apparatus 1. On this occasion, the second wireless apparatus 2 puts, in the ACK signal A106, the SN (SN=2 in the case of FIG. 2) that has not been received yet.

On receiving the ACK signal A106, the first wireless apparatus 1 retransmits the data signal corresponding to the SN that has not been received yet. In the case of FIG. 2, the first wireless apparatus 1 retransmits the data signal D102. On this occasion, the first wireless apparatus 1 sets the ACK request as the reply request of the data signal D102.

On receiving the data signal D102, the second wireless apparatus 2 determines whether the header field and the data field have been received correctly or not. When the header field and the data field have been received correctly, the second wireless apparatus 2 stores the split data Data2 included in the data field, into the region left in the reception buffer B2. In this manner, rearrangement of the split data stored in the reception buffer B2 in the SN order is referred to as (reception) buffer reordering. In addition, the second wireless apparatus 2 demodulates the header field to conclude that the first wireless apparatus 1 requests an ACK signal. Thus, the second wireless apparatus 2 sends an ACK signal A'102 back to the first wireless apparatus 1. The second wireless apparatus 2 sends the split data Data2 to Data6 from the reception buffer B2 to the upper layer (Upper).

As described above, in the case where the first and second wireless apparatuses 1 and 2 have reception buffers with sufficient sizes respectively and the first wireless apparatus 1 knows the size of the reception buffer B2 of the second wireless apparatus 2, the first wireless apparatus 1 sets the ACK request as a reply request of a data signal in accordance with the size of the reception buffer B2 of the second wireless apparatus 2. That is, when the total amount of split data which have been transmitted with the NACK request set therein exceeds the size of the reception buffer B2 of the second wireless apparatus 2, the first wireless apparatus 1 transmits transmission data to be transmitted next, with the ACK request set therein. Thus, even if the second wireless apparatus 2 fails in receiving the data signal D102, the first wireless apparatus 1 can retransmit the data signal D102 surely.

COMMUNICATION EXAMPLE 2

Figure 3:
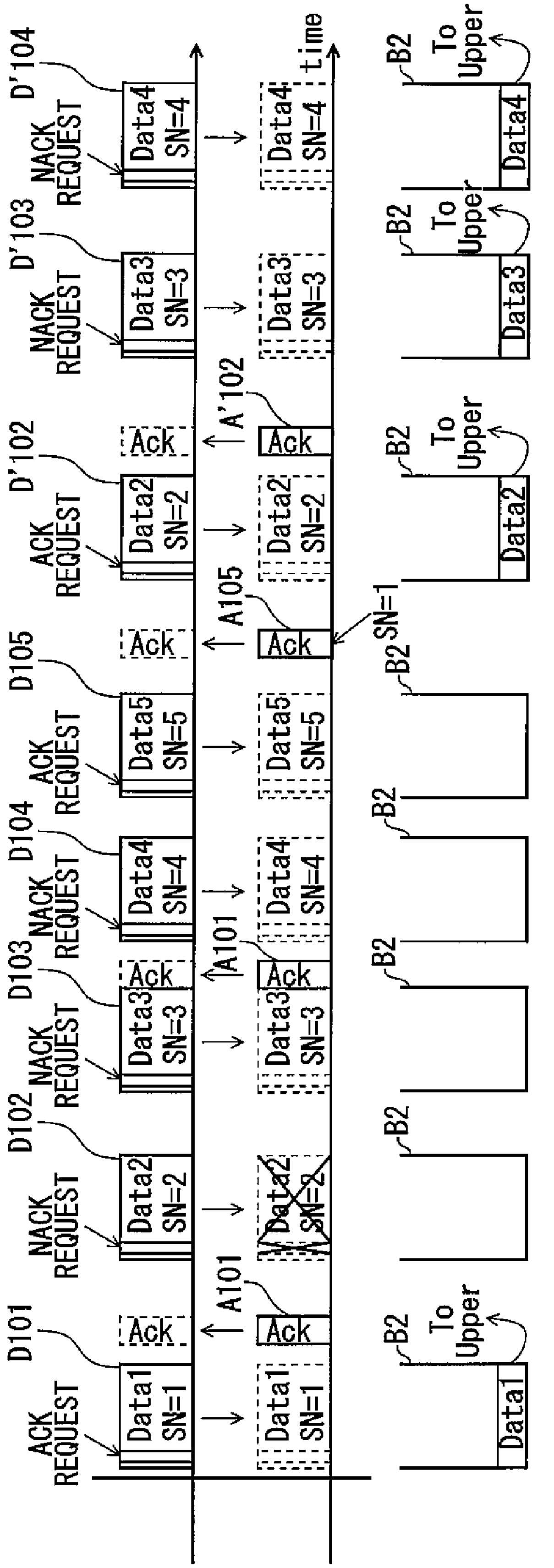
FIG. 3 illustrates another example of packet exchange between the first wireless apparatus and the second wireless apparatus.

Another example of communication between the first and second wireless apparatuses 1 and 2 will be described with reference to FIG. 3. In the example shown in FIG. 3, when the second wireless apparatus 2 fails in receiving a data signal once, the second wireless apparatus 2 transmits a reply signal in accordance with a reply request without storing split data into the reception buffer even after the second wireless apparatus 2 succeeds in receiving another data signal afterwards. Specific description will be made with reference to FIG. 3. Since the procedure up to the first wireless apparatus 1 transmits a data signal D103 is the same as that in FIG. 2, description thereof will be omitted.

On receiving the data signal D103, the second wireless apparatus 2 determines whether the second wireless apparatus 2 itself has succeeded in receiving the header field and the data field or not. When the header field and the data field have been received correctly, the second wireless apparatus 2 stores split data Data3 included in the data field, into the reception buffer B2 in the communication example 1. In this example, however, the second wireless apparatus 2 does not store the split data Data3 into the reception buffer B2 because the second wireless apparatus 2 has failed in receiving the data signal D102 once. Since reception of the header field is successful, the second wireless apparatus 2 sends a reply signal to the first wireless apparatus 1 in accordance with a reply request. On this occasion, the reply request is a NACK request and reception of the data field is successful. Thus, the second wireless apparatus 2 sends no reply signal.

Since a NACK signal has not been sent back for a predetermined period since the transmission of the data signal D103, the first wireless apparatus 1 regards the transmission of the data signal D103 as successful. The first and second wireless apparatuses 1 and 2 transmit and receive a data signal D104 in the same manner.

When transmitting plural data signals with the ACK request set as the reply request, the first wireless apparatus 1 sets an ACK request periodically and transmits a data signal therewith. In the example of FIG. 3, the first wireless apparatus 1 transmits a data signal D105 with an ACK request set as a reply request.

On receiving the data signal D105, the second wireless apparatus 2 determines whether the second wireless apparatus 2 itself has succeeded in receiving the header field and the data field or not. Although the header field and the data field have been received correctly, the second wireless apparatus 2 goes not store split data Data5 included in the data field, into the reception buffer B2. In addition, the second wireless apparatus 2 demodulates the head field to conclude that the first wireless apparatus 1 requests an ACK signal. Thus, the second wireless apparatus 2 sends an ACK signal A105 back to the first wireless apparatus 1. On this occasion, the second wireless apparatus 2 sends back the ACK signal A105 including SN(=1) corresponding to the split data DATA1 stored in the reception buffer B2 the last time.

On receiving the ACK signal A105, the first wireless apparatus 1 retransmits the data signal D102 corresponding to the SN(=2) next to the SN=1 included in the ACK signal A105. On this occasion, the first wireless apparatus 1 sets an ACK request as the reply request of the data signal D102.

On receiving the data signal D102, the second wireless apparatus 2 determines whether the header field and the data field have been received correctly or not. When the header field and the data field have been received correctly, the second wireless apparatus 2 stores split data Data2 included in the data field, into the reception buffer B2. The second wireless apparatus 2 sends the split data Data2 to the upper layer (Upper) from the reception buffer B2. In addition, the second wireless apparatus 2 demodulates the header field to conclude that the first wireless apparatus 1 requests an ACK signal. Thus, the second wireless apparatus 2 sends an ACK signal A'102 back to the first wireless apparatus 1.

On receiving the ACK signal A'102, the first wireless apparatus 1 retransmits the data signal D103. The reply request of the data signal D103 may be either an ACK request or a NACK request. A case where the NACK request is set is shown in the example of FIG. 3.

On receiving the data signal D103, the second wireless apparatus 2 determines whether the header field and the data field have been received correctly or not. When the header field and the data field have been received correctly, the second wireless apparatus 2 stores split data Data3 included in the data field, into the reception buffer B2. The second wireless apparatus 2 sends the split data Data3 to the upper layer (Upper) from the reception buffer B2. In addition, the second wireless apparatus 2 demodulates the header field to conclude that the first wireless apparatus 1 requests a NACK signal. Thus, the second wireless apparatus 2 sends no reply signal back to the first wireless apparatus 1.

The first wireless apparatus 1 transmits the data signal D104 and subsequent data signals in the same manner.

As described above, in the case where the second wireless apparatus 2 fails in reception once, the second wireless apparatus 2 does not store received split data into the reception buffer B2 even when the second wireless apparatus 2 succeeds in receiving any data signal till the second wireless apparatus 2 transmits a reply signal next. Thus, the second wireless apparatus 2 sends back the reply signal including an SN corresponding to split data stored in the reception buffer B2 the last time. When another SN than the SN of the data signal transmitted the last time is included in the reply signal, the first wireless apparatus 1 retransmits data signals from a data signal corresponding to the next number to the SN included in the reply signal to the data signal transmitted the last time, sequentially. In this manner, the first wireless apparatus 1 can reduce undetected errors in reception and can retransmit data signals surely even if the first wireless apparatus 1 does not know the size of the reception buffer of the second wireless apparatus 2.

COMMUNICATION EXAMPLE 3

Figure 4:
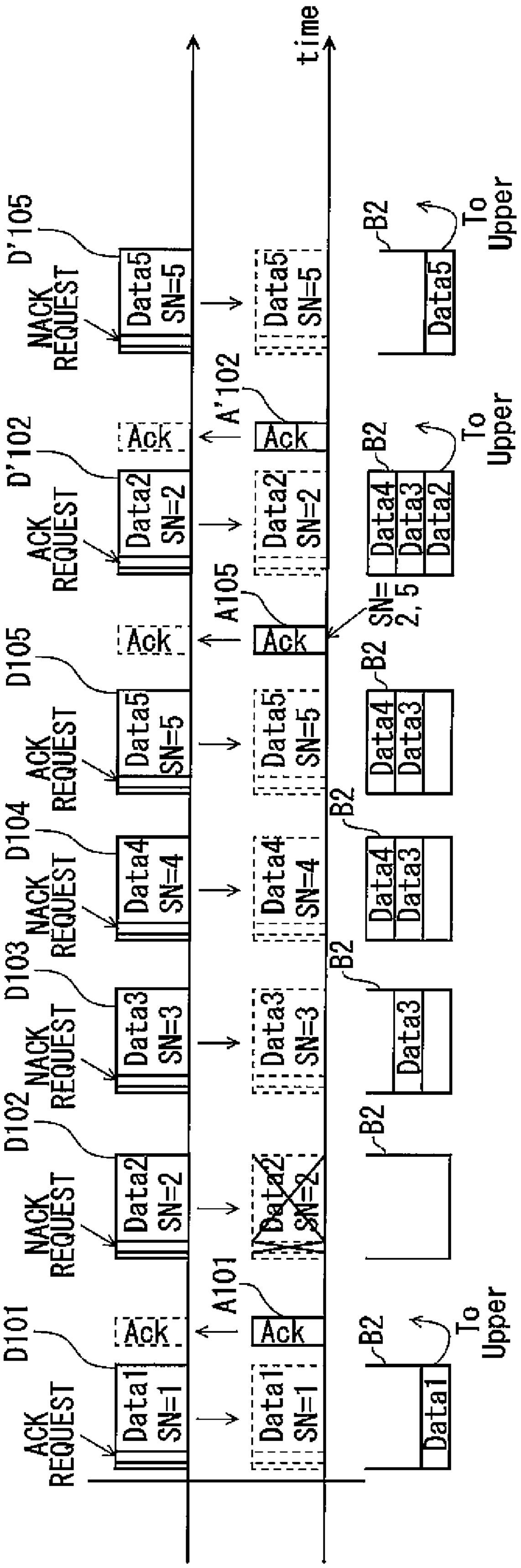
FIG. 4 illustrates another example of packet exchange between the first wireless apparatus and the second wireless apparatus.

Another example of communication between the first and second wireless apparatuses 1 and 2 will be described with reference to FIG. 4. In the example shown in FIG. 4, which is different from the example shown in FIG. 3, even after having failed in reception, the second wireless apparatus 2 stores split data into the reception buffer when the second wireless apparatus 2 succeeds in receiving any data signal afterwards. The details will be described with reference to FIG. 4. Since the procedure up to the first wireless apparatus 1 transmits a data signal D103 is the same as that in FIG. 2 or 3, description thereof will be omitted.

On receiving the data signal D103, the second wireless apparatus 2 demodulates the header field and the data field. The second wireless apparatus 2 determines whether the second wireless apparatus 2 itself has succeeded in receiving the header field and the data field or not. In the example of FIG. 4, the header field and the data field of the data signal D103 have been received correctly. Therefore, the second wireless apparatus 2 stores split data Data3 included in the data field into the reception buffer B2. However, since reception of a previous data signal D102 is unsuccessful, the second wireless apparatus 2 does not send the split data Data3 to the upper layer (Upper) from the reception buffer B2. In addition, the second wireless apparatus 2 demodulates the header field to conclude that the first wireless apparatus 1 requests a NACK signal. Thus, the second wireless apparatus 2 sends no reply signal to the first wireless apparatus 1.

Since a NACK signal has not been sent back for a predetermined period since the transmission of the data signal D103, the first wireless apparatus 1 regards the transmission of the data signal D103 as successful. The first and second wireless apparatuses 1 and 2 transmit and receive a data signal D104 in the same manner.

Even when transmitting plural data signals with the NACK request set as the reply request type, the first wireless apparatus 1 sets an ACK request periodically and transmits a data signal therewith. In the example of FIG. 4, the first wireless apparatus 1 transmits a data signal D105 with an ACK request set as the reply signal policy.

On receiving the data signal D105, the second wireless apparatus 2 demodulates the header field and the data field. The second wireless apparatus 2 determines whether the second wireless apparatus 2 itself has succeeded in receiving the header field and the data field or not. Here, assume that the size of the reception buffer B2 of the second wireless apparatus 2 is too small so that the split data Data5 cannot be stored into the reception buffer B2. In this case, even if reception of the data field is successful, the second wireless apparatus 2 does not store the split data Data5 into the reception buffer B2.

The second wireless apparatus 2 demodulates the head field of the data signal D105 to conclude that the first wireless apparatus 1 requests an ACK signal. Thus, the second wireless apparatus 2 sends an ACK signal A105 back to the first wireless apparatus 1. On this occasion, the second wireless apparatus 2 sends back the ACK signal A105 including SNs (SN=2 and SN=5 in the example of FIG. 4) corresponding to the data signals which could not be stored in the reception buffer B2 the last time. Alternatively, when one SN is notified in the ACK signal A105, the ACK signal A105 including SN=2 may be sent back, and an ACK signal A'102 which is a reply signal of a data signal D'102 and which includes SN=5 may be sent back after the data signal D'102 with SN=2 has been received.

On receiving the ACK signal A105, the first wireless apparatus 1 retransmits the data signal D102 corresponding to the smaller one (SN=2) of the SNs=2 and 5 included in the ACK signal A105. On this occasion, the first wireless apparatus 1 sets an ACK request as the reply signal policy of the data signal D102.

On receiving the data signal D102, the second wireless apparatus 2 demodulates the header field and the data field. The second wireless apparatus 2 determines whether the header field and the data field have been received correctly or not. When the header field and the data field have been received correctly, the second wireless apparatus 2 stores split data Data2 included in the data field, into the reception buffer B2. The second wireless apparatus 2 reorders the reception buffer B2, and sends the split data Data2 to Data4 stored in the reception buffer B2, to Upper. In addition, the second wireless apparatus 2 demodulates the header field to conclude that the first wireless apparatus 1 requests an ACK signal. Thus, the second wireless apparatus 2 sends an ACK signal A'102 back to the first wireless apparatus 1.

On receiving the ACK signal A102, the first wireless apparatus 1 retransmits the data signal D105 corresponding to SN=5. The reply request of the data signal D105 may be either an ACK request or a NACK request. In FIG. 4, assume that the NACK request is set.

On receiving the data signal D105, the second wireless apparatus 2 demodulates the header field and the data field. The second wireless apparatus 2 determines whether the header field and the data field have been received correctly or not. When the header field and the data field have been received correctly, the second wireless apparatus 2 stores split data Data5 included in the data field, into the reception buffer B2. The second wireless apparatus 2 sends the split data Data5 to the upper layer (Upper) from the reception buffer B2. In addition, the second wireless apparatus 2 demodulates the header field to conclude that the first wireless apparatus 1 requests a NACK signal. Thus, the second wireless apparatus 2 sends no reply signal back to the first wireless apparatus 1.

As described above, when the second wireless apparatus 2 succeeds in receiving any subsequent data signal afterwards in the case where the second wireless apparatus 2 has failed in reception once, the second wireless apparatus 2 stores split data included in the successful data signal into the reception buffer B2. When sending an ACK signal back, the second wireless apparatus 2 sends back the ACK signal including an SN for a data signal which has been received unsuccessfully or an SN for a data signal which cannot be stored in the reception buffer B2 because the reception buffer B2 is full. It will go well if the first wireless apparatus 1 retransmits the data signal corresponding to the SN included in the ACK signal. Thus, the number of times of retransmission can be reduced as compared with that in the case of FIG. 3.

EXAMPLE 1

Example 1 will be described. A wireless system according to Example 1 has the same configuration as the wireless system shown in FIG. 1, except that configuration of an ACK signal or a NACK signal to be sent back by the second wireless apparatus 2 and the communication sequence between the first and second wireless apparatuses 1 and 2 are different. Therefore, the wireless system according to Example 1 will be described with the same reference signs. The configuration of each of the first to third wireless apparatuses 1 to 3 will be described later.

Packet configuration of each data signal to be transmitted and received by the first to third wireless apparatuses 1 to 3 will be described with reference to FIG. 5. The data signal has a header field (also referred to as MAC header) and a data field (also referred to as Frame body). The data field includes a payload portion (payload) and error control information (FCS: Frame Check Sequence). The payload portion (payload) includes split data obtained as a split part of data to be transmitted.

The header field includes a Req ACK Type field and an SN field. The wireless system according to this example makes communication in one of an ACK mode in which each reception result is notified only by an ACK signal, a NACK mode in which each reception result is notified only by a NACK signal and a mixed mode in which each reception result is notified by either an ACK signal or a NACK signal. The type of a signal for giving a notification of a reception result when a data signal is received is written in the Req ACK Type field. Information (reply request) indicating that which type of reply signal should be used is included in the Req ACK Type field. When a wireless apparatus requests an ACK signal to be sent back after reception of a data signal, an ACK request is written in the Req ACK Type field. When a wireless apparatus requests a NACK signal to be sent back after reception of a data signal, a NACK request is written in the Req ACK Type field. Information (SN: Sequence Number) indicating the number of a transmitted data signal in the transmission sequence of data signals is included in the SN field. The header field may include destination address information, source address information, etc. in addition to the aforementioned fields. In addition, the header field may be divided into internal fields such as a common header and a sub header. In this case, a CRC bit for detecting an error is added to the tail of each header. Further, in this case, the destination address information, the source address information, etc. are generally included in the common header while the Req ACK Type etc. are included in the sub header. In this case, a NACK signal is sent when there is no error in the common header but there is an error in the sub header or a data field.

Figure 6:
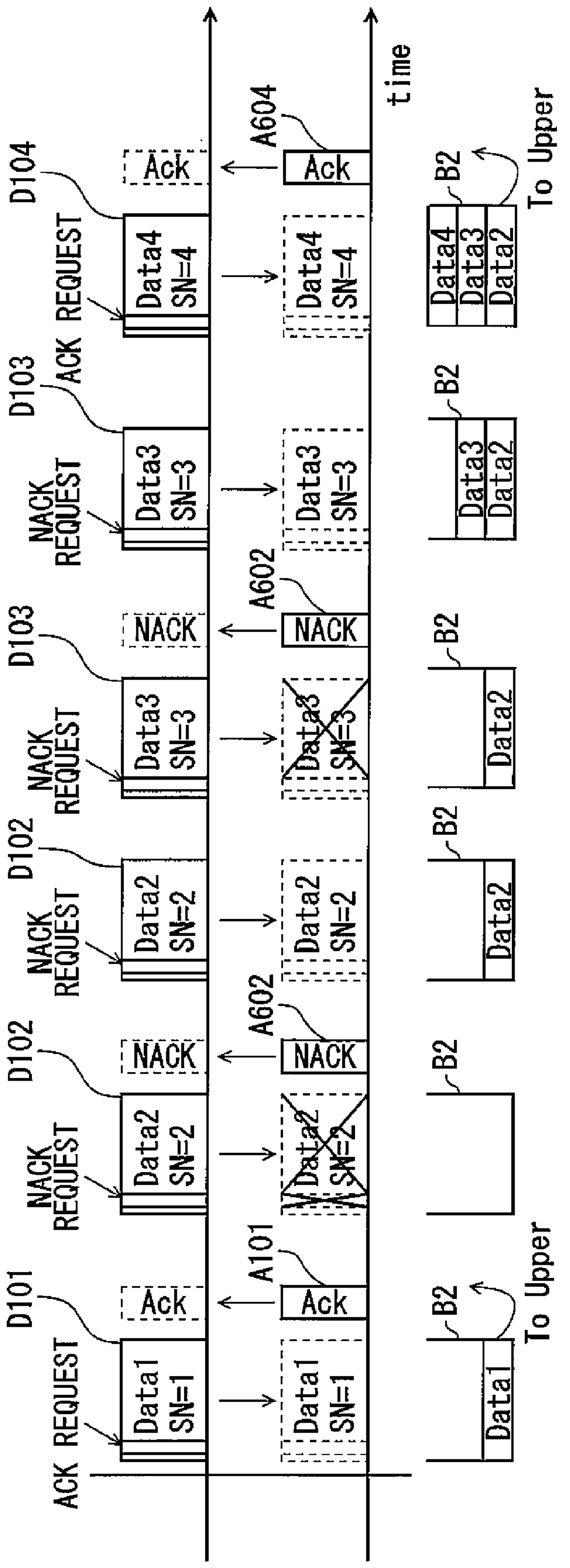
FIG. 6 illustrates packet exchange in the wireless system according to Example 1.

Next, communication between the first and second wireless apparatuses 1 and 2 after connection between the first wireless apparatus 1 as a transmitter and the second wireless apparatus 2 as a receiver is established will be described with reference to FIG. 6. Since the procedure up to the first wireless apparatus 1 transmits a data signal D102 is the same as that in FIG. 2, description thereof will be omitted.

Assume that the second wireless apparatus 2 receives the data signal D102 but fails in demodulating the header field and the data field due to deterioration of the propagation environment. Due to the failure in receiving the data field, the second wireless apparatus 2 stores nothing into the reception buffer B2. The second wireless apparatus 2 also fails in receiving the header field. Here, in the examples shown in FIGS. 2 to 4, when the second wireless apparatus 2 fails in receiving the header field, the second wireless apparatus 2 cannot determine the reply request, and does not send back either an ACK signal or a NACK signal. However, in the example shown in FIG. 6, when the second wireless apparatus 2 fails in receiving the header field, the second wireless apparatus 2 sends back a NACK signal A602. In this case, the second wireless apparatus 2 sends the NACK signal even though an ACK request is written in the Req ACK Type field by the first wireless apparatus 1.

On receiving the NACK signal A602, the first wireless apparatus 1 retransmits the data signal D102. In FIG. 6, the first wireless apparatus 1 retransmits the same signal as the data signal D102 transmitted the last time. However, the first wireless apparatus 1 may retransmit the signal in a transmission system in which it is highly likely that the signal can be received even in a deteriorated propagation environment. For example, the transmission system may be changed into a system with a low error rate or an ACK request may be written in the Req ACK Type field.

The second wireless apparatus 2 succeeds in receiving the data signal D102. The second wireless apparatus 2 determines whether to transmit a reply signal or not based on the reply request included in the header field. In this case, the reply request is a NACK signal and reception of the data signal D102 is successful. Thus, the second wireless apparatus 2 sends back no reply signal. In addition, the second wireless apparatus 2 stores split data DATA2 included in the data field, into the reception buffer B2.

Since a NACK signal has not been sent back for a predetermined period since the transmission of the data signal D102, the first wireless apparatus 1 regards the transmission of the data signal D102 as successful. The first wireless apparatus 1 transmits a data signal D103.

The second wireless apparatus 2 receives the data signal D103. The second wireless apparatus 2 determines whether the second wireless apparatus 2 itself has succeeded in receiving the header field and the data field or not. In the case of FIG. 6, the second wireless apparatus 2 has succeeded in receiving the header field of the data signal D103 but has failed in receiving the data field thereof. Based on the reception result of the header field, the second wireless apparatus 2 sends a NACK signal back to the first wireless apparatus 1.

On receiving the NACK signal from the second wireless apparatus 2, the first wireless apparatus 1 retransmits the data signal D103. The second wireless apparatus 2 receives the data signal D103. Since reception of the data signal D103 is successful this time, the second wireless apparatus 2 stores split data DATA3 into the reception buffer B2, but sends back no reply signal.

Since a NACK signal has not been sent back for a predetermined period since the retransmission of the data signal D103, the first wireless apparatus 1 regards the transmission of the data signal D103 as successful. The first wireless apparatus 1 transmits a data signal D104. In the case of the mixed mode, the first wireless apparatus 1 transmits a data signal including an ACK request every predetermined period (or every predetermined number of times) even when transmitting a data signal including a NACK request. In FIG. 6, the first wireless apparatus 1 transmits the data signal D104 including an ACK request.

The second wireless apparatus 2 receives the data signal D104. The second wireless apparatus 2 stores split data DATA4 included in the data field, into the reception buffer B2. The second wireless apparatus 2 demodulates the header field to conclude that the first wireless apparatus 1 requests an ACK signal. Thus, the second wireless apparatus 2 sends back an ACK signal A604. The second wireless apparatus 2 sends the split data DATA2 to DATA4 to Upper. The split data may be sent to Upper when data signals with consecutive SNs are received, or may be sent to Upper with a predetermined condition as a trigger, for example, whenever the reception buffer B2 is full.

As described above, the second wireless apparatus 2 sends back a NACK signal regardless of the type of reply request when the second wireless apparatus 2 fails in receiving the header field. Incidentally, when the header field has a common header and a sub header as described above, the second wireless apparatus 2 sends the NACK signal when there is an error at least in the header in which the type of reply request is written.

Figure 7:
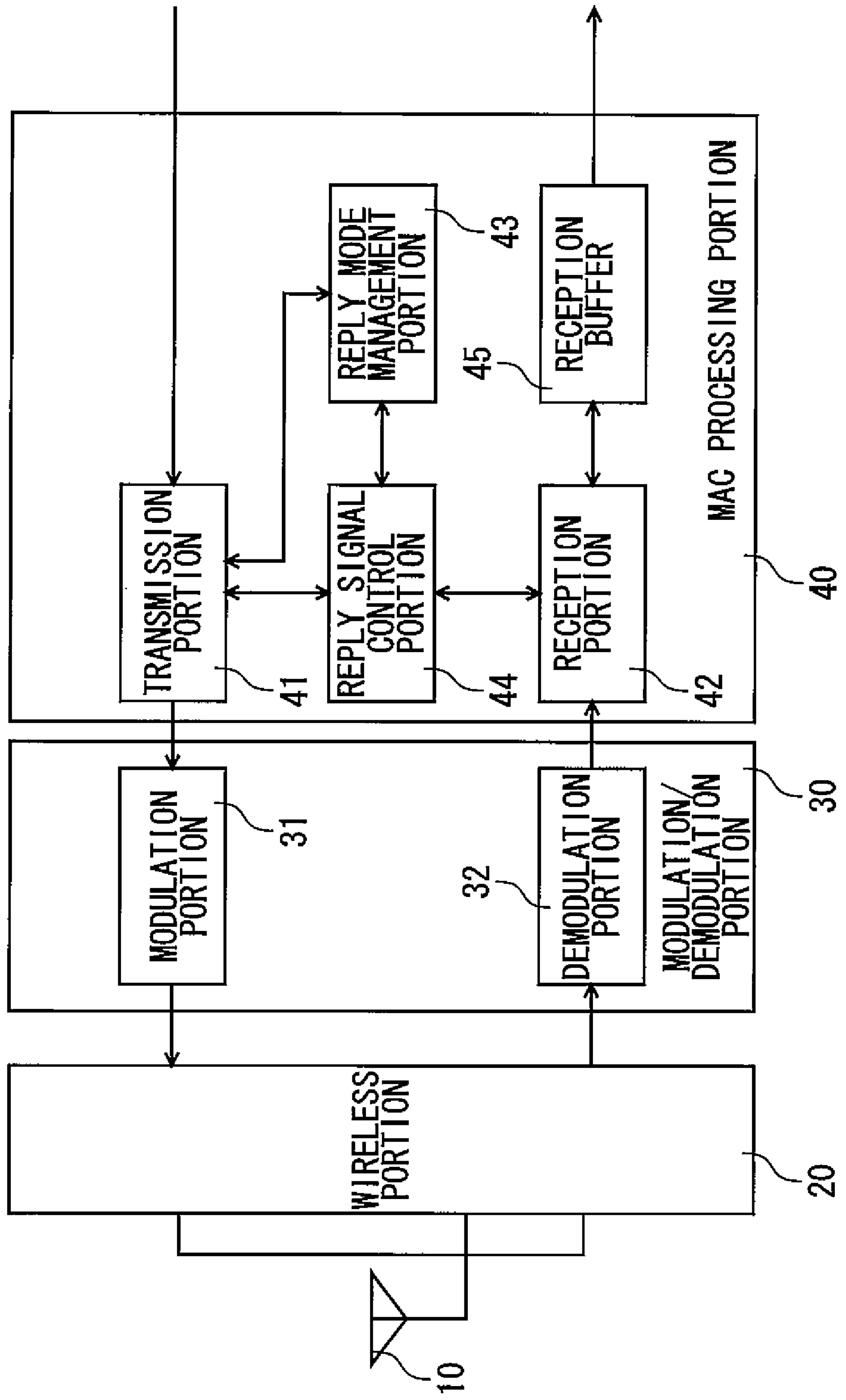
FIG. 7 illustrates a wireless apparatus according to Example 1.

Next, a configuration example of a wireless apparatus according to the example will be described with reference to FIG. 7. Although FIG. 7 shows the configuration of the first wireless apparatus 1, the second and third wireless apparatuses 2 and 3 are made to have the same configurations.

The first wireless apparatus 1 has an antenna 10, a wireless portion 20, a modulation/demodulation portion 30 and a MAC processing portion 40. The modulation/demodulation portion 30 includes a modulation portion 31 and a demodulation portion 32. The MAC processing portion 40 includes a transmission portion 41, a reception portion 42, a reply signal control portion 44, a reply mode management portion 43, and a reception buffer 45 (reception buffer B2).

First, the operation of the first wireless apparatus 1 at the time of signal transmission will be described. At the time of signal transmission, data outputted from a not-shown upper-layer processing portion is inputted to the transmission portion 41. The transmission portion 41 performs processing such as addition of a header field, so as to generate a data signal. On this occasion, the transmission portion 41 writes information indicating a reply request (ACK request/NACK request) in the Req ACK Type field in accordance with an instruction from the reply signal control portion 44.

The generated data signal is outputted to the modulation portion 31. The modulation portion 31 performs processing such as encoding processing, modulation processing, addition of a physical header, etc. on the data signal, so as to generate a physical data signal. The wireless portion 20 performs processing such as D/A conversion processing, up-conversion, etc. on the physical data signal, so as to generate a transmission signal. Then, the wireless portion 20 transmits the transmission signal through the antenna 10. In FIG. 7, the block which performs processing such as addition of a header field to generate a data signal is referred to as a transmission portion. However, parts having a transmission function in the transmission portion 41, the modulation portion 31 and the wireless portion 20 in FIG. 7 may be collectively referred to as a transmission portion or a transmission unit.

Next, the operation of the first wireless apparatus 1 at the time of signal reception will be described. A reception signal received through the antenna 10 is subjected to processing such as down-conversion, A/D conversion, etc. in the wireless portion 20 so as to be converted into a physical data signal. The demodulation portion 32 performs processing such as demodulation processing, physical header analysis, etc. on the physical data signal so as to generate a data signal. The reception portion 42 performs processing such as header field analysis on the data signal so as to generate split data.

In the aforementioned example, the block which performs processing such as header field analysis to generate split data is referred to as the reception portion 42. However, parts having a reception function in the reception portion 42, the demodulation portion 32 and the wireless portion 20 in FIG. 7 may be collectively referred to as a reception portion or a reception unit. The reception portion (reception unit) receives a data signal having a header field including reply information for specifying either an acknowledgement or a negative acknowledgement, and a data field including split data.

The reply signal control portion 44 receives the header field and the data field from the reception portion 42, and determines whether the header field and the data field have been received successfully. That is, the reply signal control portion 44 operates as a decision unit for deciding a reception result indicating whether the header field and the data field have been received successfully or not.

In the case where the header field has been received unsuccessfully, the reply signal control portion 44 gives the transmission portion 41 an instruction to send back a NACK signal. The transmission portion 41 sends the NACK signal to a communication partner. The split data is not stored in the reception buffer 45 regardless of whether the data field has been received successfully or not.

In the case where the header field has been received successfully but the data field has been received unsuccessfully, the reply signal control portion 44 gives the transmission portion 41 an instruction to send back a reply signal in accordance with a reply request written in the Req ACK Type field. The reply signal control portion 44 gives the transmission portion 41 an instruction to send back a NACK signal when a NACK request is written in the Req ACK Type field. The reply signal control portion 44 does not give the transmission portion 41 an instruction to send back a reply signal when an ACK request is written in the Req ACK Type field. In addition, since the data field has been received unsuccessfully, the split data is not stored in the reception buffer 45.

In the case where the header field and the data field have been received successfully, the reply signal control portion 44 gives the transmission portion 41 an instruction to send back a reply signal in accordance with a reply request written in the Req ACK Type field. The reply signal control portion 44 gives the transmission portion 41 an instruction to send back an ACK signal when an ACK request is written in the Req ACK Type field. The reply signal control portion 44 does not give the transmission portion 41 an instruction to send back a reply signal when a NACK request is written in the Req ACK Type field. The reception portion 42 stores split data into the reception buffer 45. When data is inputted or when a predetermined condition is satisfied, the reception buffer sends the stored split data to Upper (not shown). For example, the predetermined condition means the case where split data with an SN consecutive to the SN of split data sent to Upper the last time is inputted, or the case where the reception buffer is full.

In place of the reply signal control portion 44, the reception portion 42 may be set to operate as a decision unit for deciding a reception result indicating whether the header field and the data field have been received successfully or not. In this case, the reception portion 42 delivers, to the reply signal control portion 44, the reception result of the header field and the data field and the reply request written in the Req ACK Type field of the header field. The reply signal control portion 44 gives the transmission portion 41 an instruction to send a reply signal back to the first wireless apparatus 1, based on the reception result of the header field and the data field and the reply request written in the Req ACK Type field of the header field.

The transmission portion 41 transmits a reply signal based on the instruction of the reply signal control portion 44. The transmission portion 41 transmits an ACK signal or a NACK signal in accordance with the reply request and the reception result of the data field in the case where the header field has been received successfully. The transmission portion 41 transmits a NACK signal in the case where the header field has been received unsuccessfully. A specific method for sending back a reply signal is the same as a method for transmitting a data signal, except that the data signal is replaced by a reply signal. Thus, description of the method will be omitted.

As described above, in the wireless system according to Example 1, a NACK signal is sent back regardless of the type of a reply request in the case where the header field has been received unsuccessfully. In this manner, even if deterioration in the propagation environment leads to failure in receiving the header field, undetected errors in reception can be reduced and a data signal can be retransmitted surely.

Modification 1

Modification 1 of Example 1 will be described. In Modification 1, a method for changing over a reply mode surely will be described.

Figure 8:
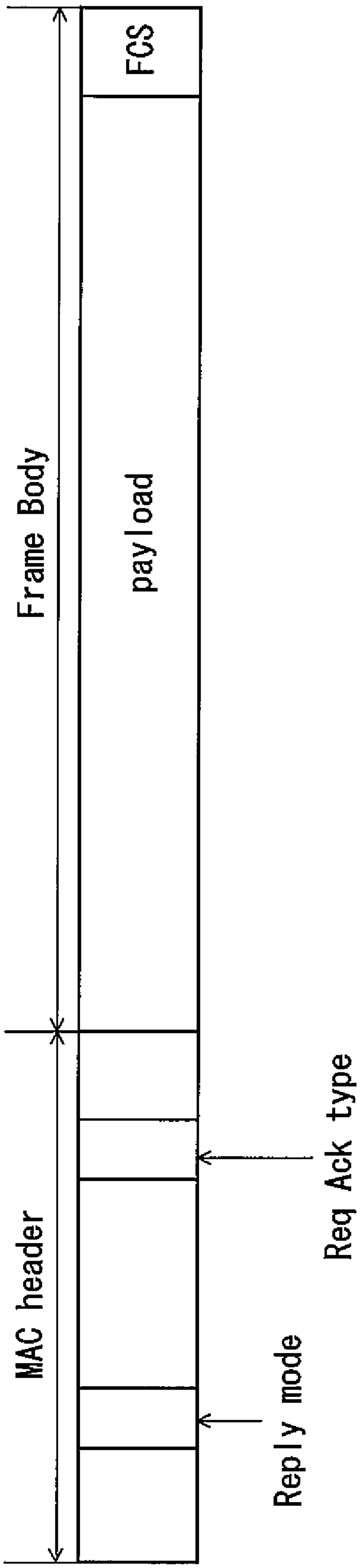
FIG. 8 illustrates a configuration example of a packet in a wireless system according to Modification 1 of Example 1.

Packet configuration of a data signal transmitted and received by the first to third wireless apparatuses 1 to 3 in Modification 1 will be described with reference to FIG. 8. The data signal in FIG. 8 has a reply mode field in a header field in addition to the packet configuration of the data signal in FIG. 5. A wireless system according to Modification 1 makes communication in one of an ACK (acknowledgement) mode in which each reception result is notified only by an ACK signal, a NACK (negative acknowledgement) mode in which each reception result is notified only by a NACK signal and a mixed mode in which each reception result is notified by either an ACK signal or a NACK signal. Information indicating that which reply mode should be used in communication is stored in the reply mode field.

Figure 9:
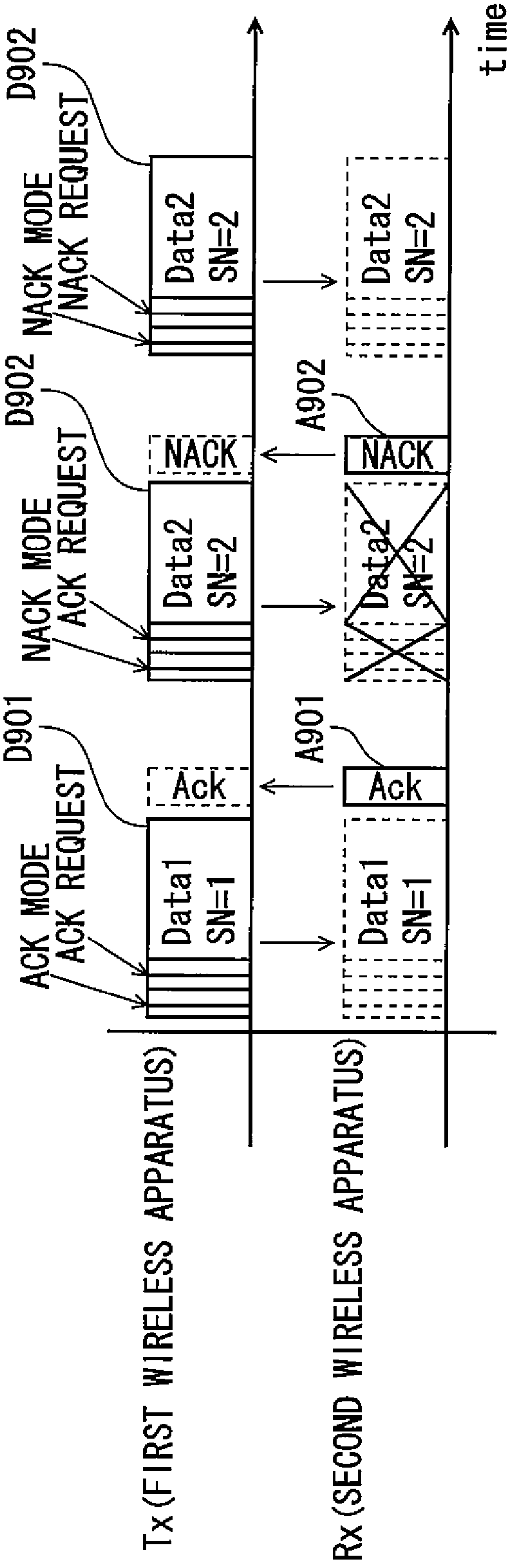
FIG. 9 illustrates packet exchange in the wireless system according to Modification 1 of Example 1.

Next, communication between the first and second wireless apparatuses 1 and 2 after connection between the first wireless apparatus 1 as a transmitter and the second wireless apparatus 2 as a receiver is established will be described with reference to FIG. 9. Here, description will be made in the case where the first and second wireless apparatuses 1 and 2 make communication in the ACK mode while making communication in the mixed mode based on a notification from the first wireless apparatus 1.

The first wireless apparatus 1 transmits a data signal D901 in which the ACK mode is written in the reply mode field of the header field and information indicating an ACK request is written in the Req ACK Type field.

The second wireless apparatus 2 receives the data signal D901. In FIG. 9, the header field and the data field have been received successfully. Therefore, the second wireless apparatus 2 sends an ACK signal A901 back to the first wireless apparatus 1. Here, in the second wireless apparatus 2, when the header field is analyzed, the reply mode management portion 43 is notified of the ACK mode written in the reply mode field.

On receiving the ACK signal A901, the first wireless apparatus 1 transmits a next data signal D902. Here, the first wireless apparatus 1 changes the reply mode from the ACK mode to the NACK mode. The first wireless apparatus 1 transmits the data signal D902 in which the NACK mode is written in the reply mode field of the header field and information indicating a NACK request is written in the Req ACK Type field.

Here, assume that the second wireless apparatus 2 has failed in receiving the header field and the data field of the data signal D902. Due to the failure in receiving the header field, the second wireless apparatus 2 sends a NACK signal A902 back to the first wireless apparatus 1.

On receiving the NACK signal A902, the first wireless apparatus 1 retransmits the data signal D902.

Assume that the second wireless apparatus 2 sends back a reply signal simply in accordance with the reply mode stored in the reply mode management portion 43. When the second wireless apparatus has failed in receiving the transmission data transmitted by the first wireless apparatus 1 changing the reply mode from the ACK mode to the NACK mode as in FIG. 9, the second wireless apparatus 2 concludes that the ACK mode is continued so that the second wireless apparatus 2 does not send back the ACK signal. For this reason, the first wireless apparatus 1 is not aware of the fact that the second wireless apparatus 2 has failed in receiving the data signal D902. On the other hand, when the second wireless apparatus 2 is set to send back a NACK signal in the case where the second wireless apparatus 2 has failed in receiving the header field as shown in this modification, the first wireless apparatus 1 can detect the fact that the second wireless apparatus 2 has failed in receiving the data signal.

Here, description has been made in the case where the first wireless apparatus 1 sends a notification of a reply mode whenever the first wireless apparatus 1 transmits a data signal. However, the reply mode may be notified only when the first wireless apparatus 1 changes over the reply mode. In addition, the reply mode is not limited to three types of the ACK mode, the NACK mode and the mixed mode, but communication may be made with a reply mode changed over between two of the three types.

EXAMPLE 2

Next, Example 2 will be described. A wireless system according to this example is different from that in Example 1 at the point that plural frames are aggregated into one packet and then transmitted.

Figure 10:
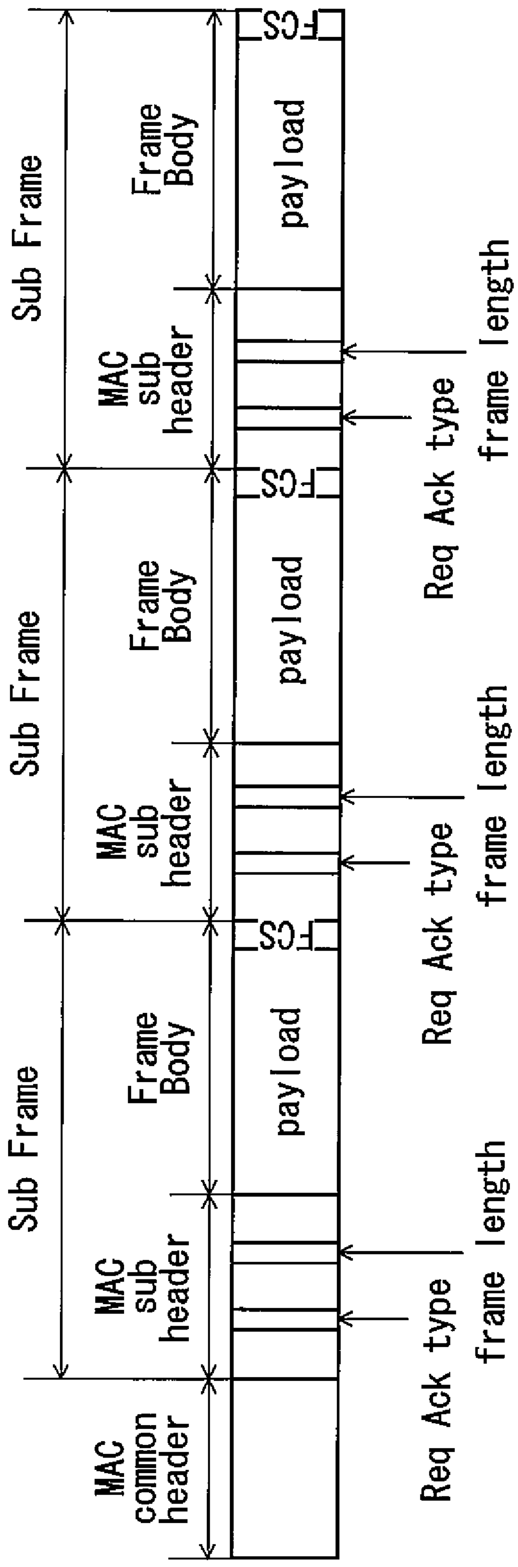
FIG. 10 illustrates a configuration example of a packet in a wireless system according to Example 2.

FIG. 10 shows an example of packet configuration of a data signal according to Example 2. The data signal has a MAC common header and plural sub frames each including a MAC sub header and a Frame body. In the following description, a data signal having plural sub frames as shown in FIG. 10 will be referred to as a multi data signal. The MAC sub header includes a Req ACK Type field indicating the type of a reply signal for sending back a reception result of the frame body. In addition, the MAC sub header includes a frame length field indicating the length of the frame body (or the length of the sub frame). The second wireless apparatus 2 receives a data signal and analyzes the frame length field of a MAC sub header to grasp the position of the next MAC sub header.

Figure 11:
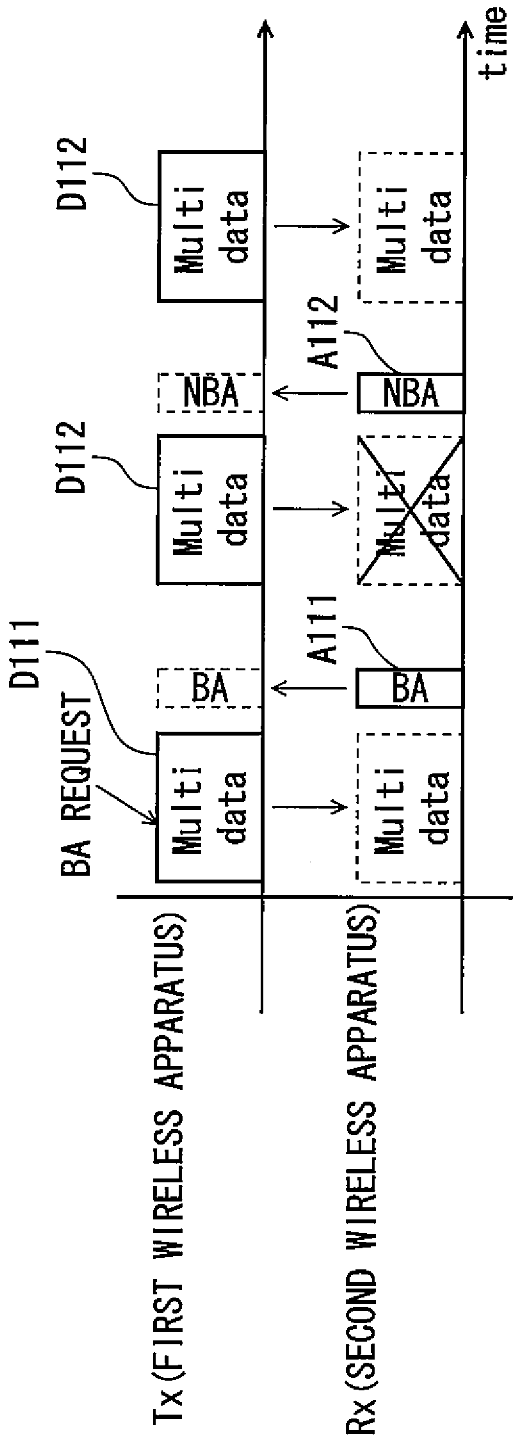
FIG. 11 illustrates packet exchange in the wireless system according to Example 2.

Next, communication between the first and second wireless apparatuses 1 and 2 after connection between the first wireless apparatus 1 as a transmitter and the second wireless apparatus 2 as a receiver is established will be described with reference to FIG. 11. Here, assume that the second wireless apparatus 2 sends back a reply signal using Block ACK (BA) or Negative Block ACK (NBA).

The Block ACK is a reply signal which will be sent back when there is even one data field that has been received correctly. The Negative Block ACK is a reply signal which will be sent back when there is even one data field that has been received unsuccessfully. Each of the Block ACK and the Negative Block ACK consists of a bitmap.

The first wireless apparatus 1 transmits a multi data signal D111. Information indicating a BA request is written in the ACK Type field of each MAC sub header of the multi data signal.

On receiving the multi data signal D111, the second wireless apparatus 2 analyzes the multi data signal D111 sequentially from the MAC common header in the head. In the example of FIG. 11, the second wireless apparatus 2 have succeeded in receiving all the headers (MAC common header and MAC sub headers) and data (frame bodies) of the multi data signal D111. Therefore, the second wireless apparatus 2 sends back a BA signal A111 indicating that all the frame bodies have been received successfully.

On receiving the BA signal A111, the first wireless apparatus 1 transmits a multi data signal D112. Information indicating a NBA request is written in the ACK Type field of each MAC sub header of the multi data signal.

On receiving the multi data signal D112, the second wireless apparatus 2 analyzes the multi data signal D112 sequentially from the MAC common header in the head. As described above, the second wireless apparatus 2 analyzes the MAC sub header disposed in the first place of the multi data signal D112 to know the position of the MAC sub header disposed in the second place. Assume that the second wireless apparatus 2 fails in receiving the MAC sub header disposed in the first place of the multi data signal D112. In this case, for example, a method for shifting the head of the next MAC sub header one by one to find the place where CRC is OK has been known as a method for detecting the next sub frame. Generally, it is highly likely that the failure in receiving the MAC sub header disposed in the first place of the multi data signal D112 may lead to failure in receiving the subsequent MAC sub headers. Therefore, when the second wireless apparatus 2 according to this example fails in receiving the MAC sub header disposed in the first place of the multi data signal D112, the second wireless apparatus 2 omits processing for finding the subsequent MAC sub headers and sends back a NBA signal regardless of the reply signal requested by the first wireless apparatus 1. The second wireless apparatus 2 sends back a NBA signal A112 as a reply signal when the second wireless apparatus 2 fails in receiving the MAC sub header disposed in the first place of the multi data signal D112.

As described above, when the second wireless apparatus 2 in the wireless system according to this example fails in receiving the MAC sub header disposed in the first place of the multi data signal D112, the second wireless apparatus 2 sends back a NBA signal regardless of information written in the ACK Type field. It is highly likely that the failure in receiving the MAC sub header disposed in the first place of the multi data signal D112 may lead to failure in receiving the subsequent MAC sub headers. Therefore, when the second wireless apparatus 2 fails in receiving the multi data signal, undetected errors in reception due to wrong determination made by the first wireless apparatus 1 that the second wireless apparatus 2 has succeeded in receiving the multi data signal can be reduced, while the second wireless apparatus 2 can reduce detection processing as compared with the case where the second wireless apparatus 2 detects all the MAC sub headers included in the multi data signal D112.

The configuration of each of the first and second wireless apparatuses 1 and 2 according to this example is the same as the configuration of the wireless apparatus shown in FIG. 7, except that the transmission portion 41 transmits a multi data signal and the reception portion 42 receives the multi data signal. Therefore, the description of the configuration of the first, second wireless apparatus 1, 2 will be omitted.

Figure 5:
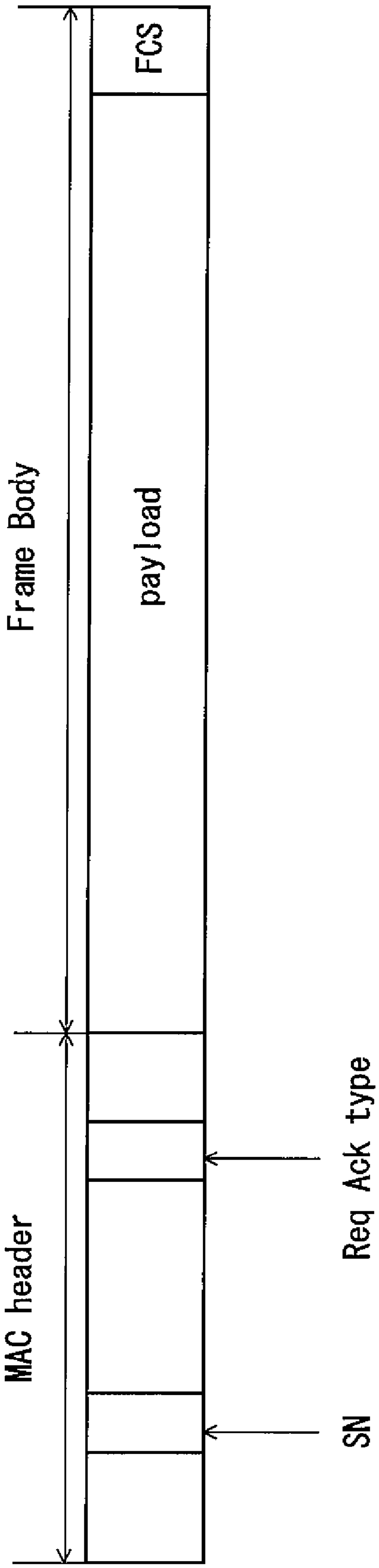
FIG. 5 illustrates a configuration example of a packet in a wireless system according to Example 1.

In addition, the MAC sub header in FIG. 10 corresponds to the MAC header in FIG. 5, and the Frame body in FIG. 10 corresponds to the Frame body in FIG. 5. That is, the first wireless apparatus 1 according to this example transmits a multi data signal in which plural data signals shown in FIG. 5 are aggregated and a MAC common header is added thereto.

EXAMPLE 3

Figure 12:
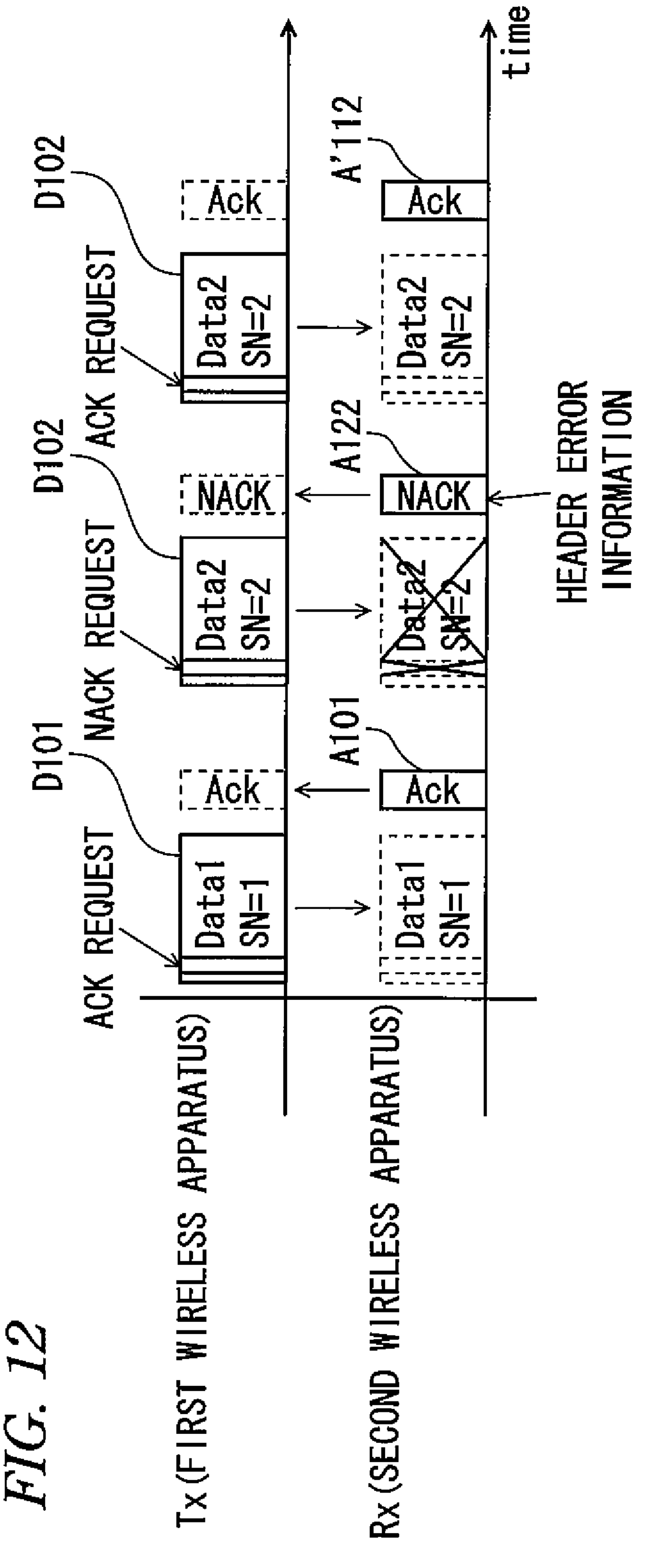
FIG. 12 illustrates packet exchange in a wireless system according to Example 3.

Example 3 will be described with reference to FIG. 12. A wireless system according to Example 3 is different from that in Example 1 or 2 at the point that a NACK signal includes information indicating whether the header field has been received unsuccessfully or the data field has been received unsuccessfully.

Communication between the first and second wireless apparatuses 1 and 2 after connection between the first wireless apparatus 1 as a transmitter and the second wireless apparatus 2 as a receiver is established will be described with reference to FIG. 12. Since the procedure up to the first wireless apparatus 1 transmits a data signal D102 is the same as that in FIG. 2, description thereof will be omitted.

Assume that the second wireless apparatus 2 receives the data signal D102 but fails in demodulating the header field and the data field due to deterioration of the propagation environment. Due to the failure in demodulating the header field, the second wireless apparatus 2 sends back a NACK signal A122 although the second wireless apparatus 2 cannot determine the reply signal type. The NACK signal A122 includes Header error information indicating the fact that the header field has been received unsuccessfully. The Header error information may be expressed by setting on a one-bit flag in the NACK signal A122.

The first wireless apparatus 1 receives the NACK signal A122. Since the Header error information is included in the NACK signal A122, the first wireless apparatus 1 retransmits the data signal D102 in which an ACK request is written in the Req ACK Type field.

Since the other configuration and operation are the same as those in the wireless system according to Example 1, description thereof will be omitted.

As described above, the second wireless apparatus 2 according to this example puts, in the NACK signal A122, information indicating whether the header field has been received unsuccessfully or successfully. Generally, the header field is transmitted in a system higher in error resilience than the data field. It is therefore highly likely that the failure in receiving the header field shows a very bad propagation environment. Accordingly, in the wireless system according to this example, communication is made in the ACK mode using an ACK signal when the propagation environment is bad enough to give rise to failure in receiving the header field, and communication is made in the NACK mode or the mixed mode using a NACK signal when the propagation environment is bad enough to give rise to failure in receiving the data field. Thus, the transmission efficiency can be improved while undetected errors in reception are reduced.

When even one MAC sub header is received unsuccessfully in the case where the first and second wireless apparatuses 1 and 2 transmit and receive a multi data signal in which sub frames are aggregated, a BA signal or a NBA signal including information indicating the fact that the MAC sub header is received unsuccessfully is transmitted. The first wireless apparatus 1 receiving the BA signal or the NBA signal including the information indicating the fact that the MAC sub header has been received unsuccessfully changes over the reply mode to the ACK mode and makes communication. Thus, the first wireless apparatus 1 can change the reply mode to the ACK mode quickly when the propagation environment deteriorates during reception of a multi data signal.

EXAMPLE 4

Example 4 will be described with reference FIG. 13. Packet configuration of a data signal exchanged in a wireless system according to this example is the same as that shown in FIG. 5. In addition, the configuration of each of the first and section wireless apparatuses 1 and 2 is the same as that in FIG. 7, except the operation of each portion.

Figure 13:
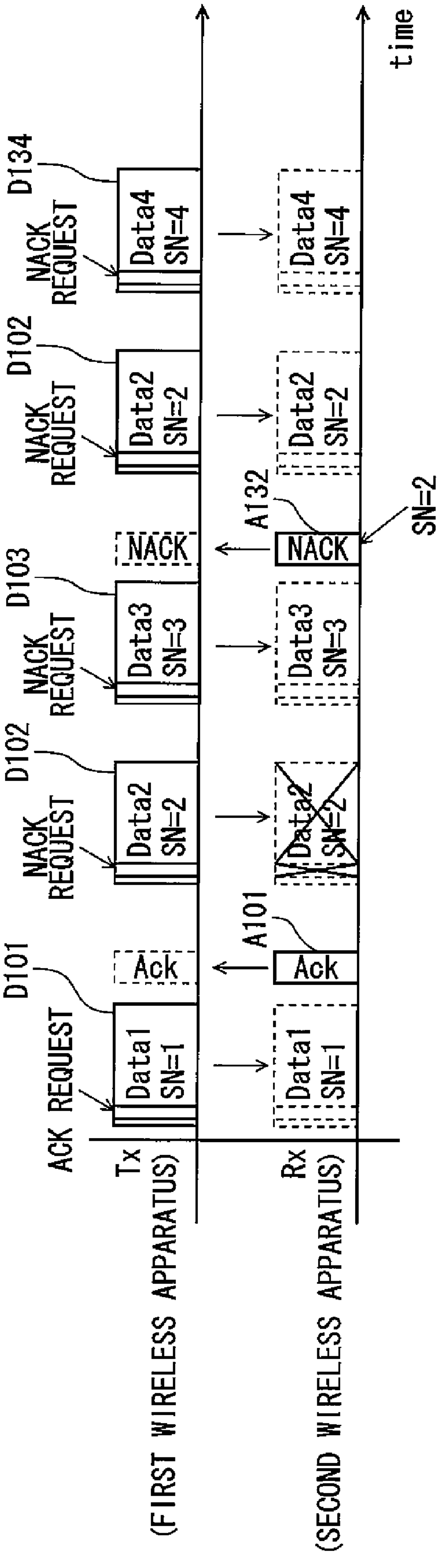
FIG. 13 illustrates packet exchange in a wireless system according to Example 4.

FIG. 13 illustrates communication between the first and second wireless apparatuses 1 and 2 after connection between the first wireless apparatus 1 as a transmitter and the second wireless apparatus 2 as a receiver is established. Since the procedure up to the first wireless apparatus 1 transmits a data signal D103 is the same as that in FIG. 2, description thereof will be omitted.

The second wireless apparatus 2 receives the data signal D103. The second wireless apparatus 2 determines whether the second wireless apparatus 2 itself has succeeded in receiving the header field and the data field or not. In the example of FIG. 13, the second wireless apparatus 2 has succeeded in receiving the header field and the data field. The second wireless apparatus 2 stores split data DATA3 included in the data field, into the reception buffer B2. On this occasion, the second wireless apparatus 2 knows that the SN of the data signal D103 is 3 from the reception result of the header field, and concludes that the SN of the data signal D103 is not consecutive to the SN(=1) of the data signal D101 received the last time. That is, the second wireless apparatus 2 concludes that a data signal D102 which has not been received exists between the data signal D101 received the last time and the data signal D103 received this time. When the second wireless apparatus 2 concludes that there is data which has not been received, the second wireless apparatus 2 notifies the first wireless apparatus 1 of that fact. In FIG. 13, the data signal D102 has not been received. Thus, the second wireless apparatus 2 sends a NACK signal A132 including information indicating SN=2 of the data signal D102, back to the first wireless apparatus 1.

The first wireless apparatus 1 receives the NACK signal A132. Since the NACK signal A132 includes the information indicating SN=2, the first wireless apparatus 1 retransmits the data signal D102 whose SN is 2. In addition, since the NACK signal A132 does not include SN=3, the first wireless apparatus 1 concludes that the second wireless apparatus 2 has succeeded in receiving the data signal D103. In FIG. 13, the first wireless apparatus 1 retransmits the data signal D102 including a NACK request.

The second wireless apparatus 2 receives the data signal D102. The second wireless apparatus 2 determines whether the second wireless apparatus 2 itself has succeeded in receiving the header field and the data field or not. In the example of FIG. 13, the second wireless apparatus 2 has succeeded in receiving the header field and the data field. The second wireless apparatus 2 stores split data DATA2 included in the data field, into the reception buffer B2. In addition, the second wireless apparatus 2 analyzes the header field and concludes that the first wireless apparatus 1 requests a NACK signal. Since the data signal D102 has been received successfully, the second wireless apparatus 2 sends back no reply signal.

When the first wireless apparatus 1 has not received a reply signal for a predetermined period since the retransmission of the data signal D102, the first wireless apparatus 1 regards the transmission of the data signal D102 as successful because no NACK signal has been sent back for a predetermined period. The first wireless apparatus 1 transmits a data signal D134.

As described above, the second wireless apparatus 2 according to this example compares the SN of a data signal currently received successfully with the SN of a data signal previously received successfully so as to determine whether the compared SNs are consecutive to each other or not. When the compared SNs are not consecutive to each other and an unsuccessfully received data signal exists between the SN of the data signal currently received successfully and the SN of the data signal previously received successfully, the second wireless apparatus 2 sends a NACK signal including the SN of the unsuccessfully received data signal, back to the first wireless apparatus 1. In place of the SN of the unsuccessfully received data signal, the second wireless apparatus 2 may transmit the NACK signal including the SN of the data signal received successfully the last time, that is the aforementioned "SN of the data signal previously received successfully" (i in FIG. 13, SN=1). Thus, even if the second wireless apparatus 2 fails in receiving the header field due to the deterioration of the propagation environment, undetected errors in reception can be reduced and the data signal can be retransmitted surely. Particularly in the case where the second wireless apparatus 2 cannot receive the data signal D102 itself and does not know whether the data signal D102 exists or not, the first wireless apparatus 1 can reduce the undetected errors in reception.

Modification 2

In Example 4, a NACK signal is set as a reply signal of a data signal D103 to be transmitted by the second wireless apparatus 2 when there is a data signal D102 received unsuccessfully. According to this modification, the type of the reply signal is decided based on whether the second wireless apparatus 2 wants retransmission of the data signal D103 or not. The other procedure is the same as in Example 4.

First, description will be made in the case where the second wireless apparatus 2 has succeeded in receiving the header field but has failed in receiving the data field. In this case, since the data signal D103 has to be retransmitted, the second wireless apparatus 2 transmits a NACK signal regardless of the type of the reply request written in the header field. The NACK signal includes the SN(=2) of the data signal D102 which has not been received, in the same manner as in Example 4.

On receiving the NACK signal including SN=2, the first wireless apparatus 1 retransmits the data signal D102. When the data signal D102 has been retransmitted successfully, the first wireless apparatus 1 retransmits the data signal D103.

Next, description will be made in the case where the second wireless apparatus 2 has succeeded in receiving the header field and the data field. In this case, retransmission of the data signal D103 is not necessary. Therefore, the second wireless apparatus 2 sends back an ACK signal regardless of the type of the reply request written in the header field. The ACK signal includes the SN(=2) of the data signal D102 which has not been received.

On receiving the ACK signal including SN=2, the first wireless apparatus 1 retransmits the data signal D102, but does not retransmit the data signal D103. Then, the first wireless apparatus 1 transmits a data signal D134 which is the next data signal.

The invention is not limited to the aforementioned embodiments, and the components in the embodiments may be modified without departing from the scope of the invention. For example, the components may be combined, and some of the components may be removed. Further, the components in different embodiments may be combined.

The invention claimed is:

1. A wireless apparatus comprising:

a communication unit which establishes wireless communication with another wireless apparatus;

a reception unit which receives a data signal from the another wireless apparatus, the data signal having a header field and a data field, the header field including a reply request which specifies either an acknowledgement or a negative acknowledgement, wherein the header field is transmitted with a higher error resilience than the data field;

a decision unit which judges whether the header field has been received successfully or unsuccessfully, and if the header field has been received unsuccessfully, further judges whether the data field has been received successfully or unsuccessfully; and a transmission unit which selects an acknowledgement mode using the acknowledgement or a negative acknowledgment mode using the negative acknowledgment based on the reply request in the received data signal;

transmits the acknowledgement or the negative acknowledgement in accordance with the reply request in a case where both of the header field and the data field have been received successfully and in a case where the header field has been received successfully but the data field has been received unsuccessfully; and transmits the negative acknowledgement in a case where at least the header field has been received unsuccessfully;

wherein the negative acknowledgement includes reception information indicating whether the header field has been received successfully or unsuccessfully.

2. The apparatus of claim 1, wherein the data signal includes a plurality of data signals each including a header field and a data field, and wherein the transmission unit transmits a collective negative acknowledgement when at least one of the header fields of the data signals is received unsuccessfully.

3. The apparatus of claim 1, further comprising an antenna through which the reception unit receives the data signal.

4. A wireless apparatus comprising:

a communication unit which establishes wireless communication with another wireless apparatus;

a transmission unit which transmits a data signal having a header field, a data field and a control data signal to the another wireless apparatus, the header field including a reply request which specifies either an acknowledgement or a negative acknowledgement and being transmitted with a higher error resilience than the data field, the control data signal specifying, as a mode to be used in the wireless communication with the another wireless apparatus, either one of:

an acknowledge mode in which a reception notification is made using the acknowledgement, and a mixed reply mode in which a reception notification is made using selectively the acknowledgement or the negative acknowledgement; and a reception unit which receives the acknowledgment or the negative acknowledgement, wherein the negative acknowledgement includes reception information indicating whether the header field has been received successfully or unsuccessfully at the another wireless apparatus, wherein the transmission unit selects one of the acknowledgement mode and the mixed reply mode based on the received reception information, and wherein the transmission unit transmits the data signal by setting the control data signal to specify the mixed reply mode at least in an initial stage of the wireless communication, and transmits the data signal by setting the control data signal to specify the acknowledge mode after the reception unit has received the negative acknowledgement from the another wireless apparatus.

5. The apparatus of claim 4, further comprising an antenna through which the transmission unit transmits the data signal.

6. A method for controlling a wireless apparatus, the method comprising:

establishing wireless communication with another wireless apparatus;

receiving a data signal from the another wireless apparatus, the data signal having a header field and a data field, the header field including a reply request which specifies either an acknowledgement or a negative acknowledgement, wherein the header field is transmitted with a higher error resilience than the data field;

judging whether the header field has been received successfully or unsuccessfully, and if the header field has been received unsuccessfully, further judging whether the data field has been received successfully or unsuccessfully;

selecting an acknowledgement mode using the acknowledgement or a negative acknowledgment mode using the negative acknowledgment based on the reply request in the received data signal; and transmitting the acknowledgement or the negative acknowledgement in accordance with the reply request in a case where both of the header field and the data field have been received successfully and in a case where the header field has been received successfully but the data field has been received unsuccessfully, and transmitting the negative acknowledgement in a case where at least the header field has been received unsuccessfully;

wherein the negative acknowledgement includes reception information indicating whether the header field has been received successfully or unsuccessfully.

7. The method of claim 6, wherein the data signal includes a plurality of data signals each including a header field and a data field, and wherein the transmitting includes transmitting a collective negative acknowledgement when at least one of the header fields of the data signals is received unsuccessfully.

* * * * *